(12) United States Patent
Abe et al.

(10) Patent No.: US 11,104,820 B2
(45) Date of Patent: Aug. 31, 2021

(54) INK JET RECORDING METHOD

(71) Applicant: CANON KABUSHIKI KAISHA, Tokyo (JP)

(72) Inventors: Shigemoto Abe, Yokohama (JP); Mikio Sanada, Kawasaki (JP); Sayoko Nagashima, Kawasaki (JP); Yoshihide Aikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/511,117

(22) Filed: Jul. 15, 2019

(65) Prior Publication Data

US 2020/0032091 A1 Jan. 30, 2020

(30) Foreign Application Priority Data

Jul. 26, 2018 (JP) .............................. JP2018-140506
Jun. 6, 2019 (JP) .............................. JP2019-106144

(51) Int. Cl.
 *C09D 11/38* (2014.01)
 *B41J 11/00* (2006.01)
 *B41M 5/00* (2006.01)
 *B41J 2/01* (2006.01)

(52) U.S. Cl.
 CPC ............ *C09D 11/38* (2013.01); *B41J 11/002* (2013.01); *B41M 5/0047* (2013.01); *B41J 2/01* (2013.01)

(58) Field of Classification Search
 CPC ..... B41J 2/0457; B41J 2/04541; B41M 3/001
 See application file for complete search history.

(56) References Cited

U.S. PATENT DOCUMENTS

| | | | |
|---|---|---|---|
| 2,978,352 A * | 4/1961 | Clarke | .................. C09B 11/04 |
| | | | 427/150 |
| 6,027,210 A | 2/2000 | Kurabayashi et al. | |
| 6,706,105 B2 | 3/2004 | Takada et al. | |
| 7,374,606 B2 | 5/2008 | Sato et al. | |
| 7,695,099 B2 | 4/2010 | Sanada et al. | |
| 8,389,600 B2 | 3/2013 | Suzuki et al. | |
| 8,393,726 B2 | 3/2013 | Moribe et al. | |
| 9,371,461 B2 | 6/2016 | Saito et al. | |
| 9,534,127 B2 | 1/2017 | Sanada et al. | |

FOREIGN PATENT DOCUMENTS

| | | | |
|---|---|---|---|
| JP | 2000-127358 A | 5/2000 | |
| JP | 2003-336183 A | 11/2003 | |

* cited by examiner

*Primary Examiner* — Lam S Nguyen
(74) *Attorney, Agent, or Firm* — Venable LLP

(57) ABSTRACT

To provide an ink jet recording method which can record an image on a recording medium irrespective of what material is selected therefor. The ink jet recording method is a method of recording an image on a recording medium with a colorless transparent aqueous ink and includes a step of applying, to the recording medium, the aqueous ink containing a mineral acid and having a pH of 1.0 or less; and a step of forming carbon by making use of the mineral acid.

9 Claims, 1 Drawing Sheet

INK JET RECORDING METHOD

BACKGROUND OF THE INVENTION

Field of the Invention

The present invention relates to an ink jet recording method.

Description of the Related Art

In a typical ink jet recording method, an image is recorded on a recording medium with a coloring material contained in an ink. On the other hand, ink jet recording methods not using a coloring material (dye or pigment) which represents color are proposed (Japanese Patent Application Laid-Open Nos. 2000-127358 and 2003-336183). These methods are each a method of forming a latent image on a recording medium and causing an image to appear when necessary. In these methods, a precursor of a coloring material such as leuco dye is used for an ink and color is then developed to record an image.

Japanese Patent Application Laid-Open No. 2000-127358 describes a latent-image recording method using an ink jet recording apparatus. Described specifically, a colorless transparent liquid is applied to paper used as a recording medium to form a colorless transparent latent image on the recording medium. Then, post treatment is performed by applying an ink containing a substance which changes color in response to a pH change to the recording medium having the latent image formed thereon. Such a constitution visualizes the colorless transparent latent image, making use of a difference between a surface pH of the recording medium and a pH of a transparent ink image of the recording medium.

As the recording medium, not only paper but also wood or cloth is used. Japanese Patent Application Laid-Open No. 2003-336183 describes fiber products obtained by applying an acid-containing ink while using an ink jet system. Described specifically, a pattern, which will be an image, is formed on transfer paper with an ink containing a dye which sublimes when reaching a predetermined temperature and is then, brought into contact with a fabric at the predetermined temperature and a predetermined pressure to transfer the image to the fiber product.

In Japanese Patent Application Laid-Open No. 2000-127358, paper is used as a recording medium while in Japanese Patent Application Laid-Open No. 2003-336183, a fabric is used as a recording medium. When a material of a recording medium was selected from paper, wood, cloth or the like as conventional, it was necessary to select a coloring material or design an ink, each suited for the selected material.

An object of the invention is therefore to provide an ink jet recording method which can record an image on a recording medium irrespective of a material thereof.

SUMMARY OF THE INVENTION

The invention relates to an ink jet recording method of recording an image on a recording medium. The method includes an ink application step of applying to the recording medium a colorless transparent aqueous ink containing a mineral acid and having a pH at 25° C. of 1.0 or less and a carbon formation step of forming carbon by making use of the mineral acid.

The invention makes it possible to provide an ink jet recording method of recording a highly precise image on a recording medium such as not only paper but also wood, cloth or the like, irrespective of such materials.

Further features of the present invention will become apparent from the following description of exemplary embodiments with reference to the attached drawings.

BRIEF DESCRIPTION OF THE DRAWINGS

FIGS. 1A and 1B are schematic views showing one example of an ink jet recording apparatus to be used in the ink jet recording method of the invention, in which FIG. 1A is a perspective view of the main part of the ink jet recording apparatus and FIG. 1B is a perspective view of a head cartridge.

DESCRIPTION OF THE EMBODIMENTS

Ink Jet Recording Method

Figure 1A:
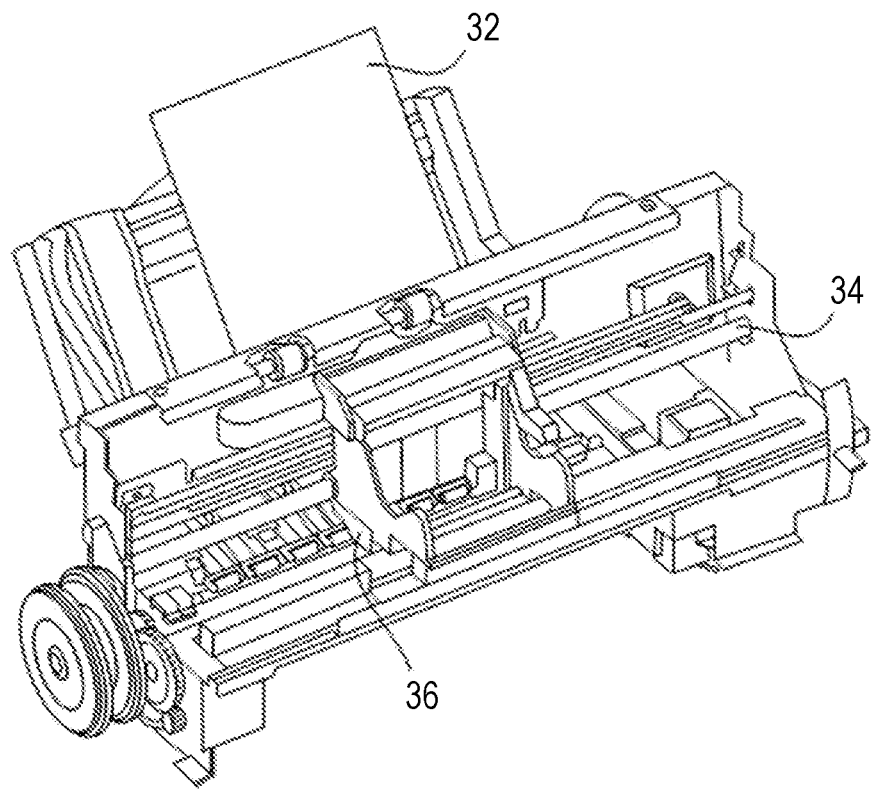

During a procedure of studying a recording method of recording on wood, paper, cloth or the like selected as a recording medium, the present inventors payed attention to that a factor which requires selection of a coloring material and designing of an ink suited for the recording medium is a coloring material in the ink or a precursor for the coloring material. They therefore investigated a method of recording an image on a recording medium without using such a material. As a result of investigation, the present inventors have got an idea, as a method of recording an image on a recording medium without using an ink containing a coloring material or a precursor thereof, of newly forming a color representing component on a recording medium. They have decided to make use of a carbon atom, which is a constituting element of a recording medium such as wood, paper or cloth, as a raw material of a coloring material to be formed newly. They have also got an idea of, when a recording medium has been colored in advance, forming carbon as a new coloring material on a recording medium and then removing the carbon and the color from the colored recording medium.

The ink jet recording method of the invention is accomplished based on these ideas. It is a method of recording an image on a recording medium with a colorless transparent aqueous ink and includes the following two methods.

(1): A method having an ink application step of applying an aqueous ink containing a mineral acid and having a pH at 25° C. of 1.0 or less to the recording medium and a carbon formation step of forming carbon by making use of the mineral acid.

(2): The method described in (1) above, wherein the recording medium has been colored in advance and the method further has, after the carbon formation step, a carbon removal step of removing the resultant carbon from the recording medium.

By giving preferred embodiments of the recording methods described in (1) and (2) above, the invention will hereinafter be described in detail. In the invention, when a compound is a salt, the salt is present in an ink while being dissociated into ions but for the convenience sake, an expression "contains a salt" is used. An aqueous ink for ink jet may be called "ink" simply. A physical property value is a value at normal temperature (25° C.) unless otherwise particularly specified.

The Recording Method (1)

The present recording method includes an ink application step of applying a mineral acid-containing ink to a recording medium; and a carbon formation step of subjecting the recording medium to which the ink has been applied in the ink application step to a treatment of newly forming carbon, which will be a coloring material, by making use of the mineral acid to record an image.

Ink Application Step

The present step directly applies an ink containing a mineral acid and having a pH at 25° C. of 1.0 or less to a recording medium including a carbon atom-containing component. Ink application is performed using a serial type recording head, a full multi type one or the like. First, an ink to be used in the present step will be described.

Aqueous Ink

The ink is colorless and transparent, contains at least a mineral acid and has a pH of 1.0 or less. The term "colorless transparent" as used herein means that the ink does not show any substantial absorption in a visible range. More specifically, when an absorbance of an ink is measured without dilution within a range of from 300 nm to 800 nm and the sum of the absorbances at three wavelength points of 400, 500 and 600 nm is less than 0.1, the ink can be regarded as "colorless transparent". Components usable for the ink will hereinafter be described, respectively. The term "(meth) acrylic acid" and "(meth)acrylate" as used herein mean "acrylic acid or methacrylic acid" and "acrylate or methacrylate", respectively.

Mineral Acid

A mineral acid is applied to recording medium as one of components of the aqueous ink. In a carbon formation step performed subsequently, due to thickening caused by evaporation of water or a water-soluble organic solvent by a treatment such as heating, the mineral acid deprives a carbon atom-containing component in the recording medium of its water molecule (dehydrating action) in the molecule of the component to form carbon. The term "carbon" used in the invention and formed by the action of the mineral acid is a carbon atom-containing component that remains after dehydration of the carbon atom-containing component before treatment and it is preferably composed only of a carbon atom. As the mineral acid, sulfuric acid, nitric acid or phosphoric acid is preferably used. Of these mineral acids, sulfuric acid or phosphoric acid that does not evaporate and therefore is likely to have an increased concentration and have enhanced dehydrating action in the carbon formation step is preferred, with sulfuric acid having enhanced dehydrating action when thickened and heated being more preferred.

The content (% by mass) of the mineral acid in the ink is preferably 1.0% by mass or more to 30.0% by mass or less, more preferably 2.0% by mass or more to 20.0% by mass or less, each based on the total mass of the ink. The content is particularly preferably 6.0% by mass or more to 15.0% by mass or less. When the content of the mineral acid becomes more than 30.0% by mass, the resulting ink has an increased viscosity or is liable to cause corrosion of a member of a recording apparatus, which may make it difficult to achieve stable ejection. When the content of the mineral acid is less than 1.0% by mass, a small amount of the mineral acid leads to a decrease in the amount of carbon formed therefrom so that an image thus formed becomes pale or it takes much energy or time to form carbon. Thus, this may sometimes impede efficient image recording.

Aqueous Medium

For the ink, water or an aqueous medium which is a solvent mixture of water and a water-soluble organic solvent can be used. As the water, deionized water (ion exchanged water) is preferably used. The content (% by mass) of the water in the ink is preferably 40.0% by mass or more to 98.0% by mass or less, more preferably 60.0% by mass or more to 90.0% by mass or less, each based on the total mass of the ink. The total content (% by mass) of the mineral acid and the water in the ink is preferably 80.0% by mass or more based on the total mass of the ink. By adjusting the content as described above, the concentration of the mineral acid shows a rapid increase and therefore, carbon can be formed more efficiently in the subsequent carbon formation step such as heat treatment. The upper limit of the total content (% by mass) of the mineral acid and the water in the ink is 100.0% by mass. The total content is preferably 90.0% by mass or less.

As the water-soluble organic solvent, any of conventionally used typical ones can be used. Specific examples of the water-soluble organic solvent include alcohols, glycols, (poly)alkylene glycols, nitrogen-containing compounds and sulfur-containing compounds. These water-soluble organic solvents can be used either singly or in combination of two or more thereof if necessary. The water-soluble organic solvent to be contained in the ink has preferably a vapor pressure at 25° C. lower than the vapor pressure at 25° C. of water. The content (% by mass) of the water-soluble organic solvent in the ink is preferably 1.0% by mass or more to 30.0% by mass or less, more preferably 2.0% by mass or more to 20.0% by mass or less, each based on the total mass of the ink. Although evaporation of the water-soluble organic solvent in the ink tends to lead to deteriorated ejection properties, a volatile water-soluble organic solvent is advantageous from the standpoint of efficient carbon formation due to rapid concentration of the mineral acid. The water-soluble organic solvent is therefore preferably selected in consideration of the balance between them.

Coloring Material

The ink used in the invention is colorless and transparent. When the ink contains no coloring material, it becomes "colorless transparent". The ink may however contain a slight amount of a coloring material to have a decorating property, ink stability or the like. When the ink contains the coloring material, the content (% by mass) of the coloring material in the ink is preferably 0.1% by mass or less, more preferably 0.001% by mass or less, each based on the total mass of the ink.

Resin

The ink may contain a resin. In the invention, at least a portion of a component which forms carbon is carbonized by dehydrating action and thus, carbon is formed. The carbon thus formed is originally a constituting component of a recording medium so that the image obtained by the recording method of the invention therefore has, to some extent, better abrasion resistance than a typical image recorded with an ink containing a coloring material such as pigment. In order to have still better abrasion resistance, however, the ink may contain a resin. The resin in the ink may be either dissolved in the aqueous medium (water-soluble resin) or dispersed therein (resin particles). The resin is preferably present stably in a strongly acidic ink having a pH of less than 1.0. Examples of such a resin include cationic resins.

Examples of the cationic resin include resins having a primary to tertiary amine structure, resins having a quaternary ammonium salt structure and resins having a phosphonium salt structure. Specific examples include resins having a vinylamine, allylamine, vinylimidazole, vinylpyridine, dimethylaminoethyl methacrylate, ethyleneimine or guanidine structure. The cationic group of these resins may be a salt type. These resins may be used either singly or in combination of two or more. The content (% by mass) of the resin in the ink is preferably 0.1% by mass or more to 5.0% by mass or less, more preferably 0.1% by mass or more to 1.0% by mass or less, each based on the total mass of the ink.

Other Components

The ink may contain, in addition to the above-described components, a water-soluble organic compound which is solid at normal temperature, for example, a polyhydric alcohol such as trimethylolpropane or triethylolethane or a urea derivative such as urea or ethyleneurea, if necessary. Further, the ink may contain, if necessary, various additives such as surfactant, pH regulator, rust inhibitive, antiseptic, mildew proofing agent, antioxidant, reduction preventive, evaporation accelerator and chelating agent.

Physical Properties of Ink

In the invention, since the mineral acid-containing ink has a pH of 1.0 or less, carbon formation making use of the mineral acid can be performed efficiently. The pH of the ink is a value at 25° C. and the pH is adjusted preferably to 1.0 or less by the kind or content of the mineral acid. The ink has a viscosity at 25° C. of preferably 1.0 mPa·s or more to 15.0 mPa·s or less, more preferably 1.0 mPa·s or more to 10.0 mPa·s or less. Further, the ink has a static surface tension at 25° C. of preferably 17 mN/m or more to 45 mN/m or less.

Recording Medium

In the invention, dehydrating action is caused by the mineral acid-containing ink to form carbon newly on the recording medium. In a region of the recording medium to which the mineral acid-containing ink is applied, a component which forms carbon should be present. More specifically, it is only necessary to (i) use a recording medium having a component which forms carbon or (ii) add, to a recording medium not having a component which forms carbon, a component which forms carbon by making use of the mineral acid. The component usable for a recording medium will hereinafter be described.

Base Material

Examples of the base material include materials constituted of a component which forms carbon such as wood, paper and cloth and those not having a component which forms carbon such as plastic, glass and metal. The base materials constituted of a component which forms carbon can be used as is as a recording medium without subjecting them to a treatment as will be described later or can be subjected to a treatment as will be described later and then used as a recording medium. The base materials not having a component which forms carbon can be used as a recording medium after subjected to a treatment as will be described later. Examples of the form of the base material include sheet, plate, film and cloth (nonwoven fabric or woven fabric).

Examples of the base material constituted of a component which forms carbon include wood, paper and cloth. They are each constituted of a saccharide. Wood is a base material constituted of cellulose and examples include cypress, cedar, red pine and paulownia. The wood can be used after sliced into a thin sheet or as a laminate obtained by bonding the resulting thin sheet to another material (such as paper). Paper is a base material constituted mainly of cellulose and it may contain various additives. The cloth is also a base material constituted mainly of cellulose Examples of the fiber constituting the cloth include natural fibers such as cotton, hemp, wool and silk and synthetic fibers such as rayon (viscose), cuprammonium rayon, polynosic, vinylon, nylon and lyocell (wood fibers put on the market with the name "Tencel" (trade name)). A blended fabric having these fibers may also be used.

The wood, paper, cloth or the like may contain an additive. When the additive is a component that reacts with the mineral acid to form its salt, however, it is preferred to reduce its content (to approximately 1.0% by mass or less based on the base material) or not to use it, because as described above, the invention makes use of the dehydrating action of the mineral acid so that when the mineral acid reacts with the recording medium to form its salt, an amount of the mineral acid capable of exhibiting the dehydrating action decreases. When, for example, paper is used as a recording medium, paper poor in a component (filler, sizing agent or the like) that reacts with the mineral acid to form its salt is preferred. Specific examples of such paper include Japanese paper and rayon sheet.

In addition, as the base material constituted of a component which forms carbon, that constituted of lactose, sucrose or starch or a derivative thereof can be used. Examples of the base material constituted of lactose or sucrose include candies, while those constituted of starch include processed products of grain (rice crackers, rice cakes, bread, pasta and noodles). Of these saccharides, when compared with a compound having a large molecular weight such as cellulose, a compound having a small molecular weight such as lactose can form carbon efficiently in a relatively short time.

Examples of the base material not having a component which forms carbon include plastics such as polyethylene terephthalate and polyvinyl chloride, glass and metals such as copper, iron and alloy. Since these base materials do not have a component which forms carbon, they are used after subjected to a treatment described later. It should be noted that the plastics are carbon-having materials but are different from saccharides and they do not contain carbon atoms, hydrogen atoms and oxygen atoms at a ratio enough to cause a dehydrating reaction. A reaction that forms carbon by making use of the mineral acid therefore does not occur.

Among the above-described base materials, those having water absorption properties or heat resistance are preferably selected in consideration of the productivity such as carbon formation efficiency in the carbon formation step which will be described later. As such a recording medium, those constituted of a saccharide are preferred, with those having cellulose as a main component such as wood, paper and cloth being more preferred. With the progress of the carbon formation step, the base material tends to be weakened because the dehydrating action may lead to a partial decomposition of the component of the recording medium. For example, in case of using the carbon formation step of forming carbon after applying the ink to an outline portion of the image for a purpose of cutting out the image, it is preferred to select, from recording media having cellulose as a main component thereof such as wood, paper and cloth, base materials with small thickness because it facilitates cutting-out.

The recording medium may have been colored in advance. Particularly when a carbon removal step which will be described later is performed and an image is recorded by decoloring, the recording medium has preferably been colored in advance also to obtain a clear image. The term "recording medium has been colored" means that a recording medium has been colored with a coloring material and in addition, as a recording medium such as Japanese paper colored with lignin contained in the component thereof, a recording medium has been tinted with a component not embraced in a so-called "coloring material.

Examples of a method of coloring a recording medium include a method of manufacturing a recording medium and then coloring it and a method of manufacturing a recording medium from a material colored in advance. Examples of a material for coloring a recording medium include coloring materials such as dyes and pigments. As the coloring material, any conventionally known coloring materials can be used and also newly synthesized ones are usable. A coloring material for coloring a recording medium preferably dissolves in the mineral acid, is decomposed by the mineral acid or changes into a form easily soluble in water by the mineral acid. Particularly preferable specific examples of such a coloring material include indigo.

When an image is recorded by decoloring while using a recording medium colored in advance, a recording medium having a colored surface but an uncolored inside is preferably used from the standpoint of decoloring efficiency. This means that it is preferred that when the recording medium is paper, it has not been colored inside thereof and when it is cloth, it has not been colored inside a yarn (fiber). For example, a dyed yarn serving as a "warp" constituting a denim fabric is manufactured by rope dyeing or the like and only the surface of the yarn has been colored with a dye. Such a yarn creates a so-called "ring-dyed" state. As a recording medium to be used for recording an image by decoloring, a denim fabric is particularly preferred.

Treatment of Base Material

When the base material not having a component which forms carbon is used, it is necessary to perform a treatment of applying a component which forms carbon to the base material (recording medium), separately from the mineral acid-containing ink, before or after application of the ink. In the invention, both a base material subjected to such a treatment after application of the ink and the base material subjected to such a treatment before the application of the ink are called "recording medium". This means that when the treatment of applying a component which forms carbon is given to the base material not having a component which forms carbon (an ink application step may be performed prior thereto), the base material subjected to such a treatment is described as "recording medium". It is needless to say that also when a base material constituted of a component which forms carbon is used, the treatment of applying a component which forms carbon may be performed.

As the method of applying to a recording medium a component which forms carbon, it is preferred to prepare a liquid containing the component which forms carbon and applying it to the recording medium. Specific examples include a method of coating the liquid by a bar coater or the like and a method of ejecting the liquid, similar to the mineral acid-containing ink, from an ink jet type recording head and then applying it. The component which forms carbon however easily increases the viscosity of the ink so that when the liquid is ejected from an ink jet type recording head, the content of the component in the liquid cannot be increased so much. For application of a necessary amount to the recording medium, therefore, the treatment is sometimes required to be performed multiple times so that application by coating is more preferable than application by ejection.

The component which forms carbon by making use of the mineral acid is preferably a saccharide. The saccharide is composed of a carbon atom, an oxygen atom and a hydrogen atom and when dehydrating action is caused by the mineral acid, the saccharide forms carbon. Examples of the saccharide include monosaccharides, disaccharides, oligosaccharides and polysaccharides. Examples of the monosaccharides include glucose, galactose and fructose. Examples of the disaccharides include sucrose, lactulose, lactose, maltose, trehalose and cellobiose. Examples of the oligosaccharides include cyclodextrin. Examples of the polysaccharides include starches such as amylose and amylopectin, glycogen, cellulose, agarose, pectin and xyloglucan. Derivatives of the above-described saccharides can also be used. Of these, at least one saccharide selected from the group consisting of lactose, sucrose, starches and cellulose and derivatives thereof is preferred.

When the component which forms carbon is applied to a recording medium, the recording medium may have been provided with a receiving layer in advance. As a method of applying a receiving layer to a recording medium, an existing technique for producing an ink jet recording medium can be used. The recording medium may be subjected to surface modification. For the surface modification, also an existing technique can be used. Examples include plasma treatment, corona treatment and ozone treatment. Formation of the receiving layer and surface modification may be performed in combination.

Carbon Formation Step

The present step is performed after the ink application step and it is a step of forming carbon, which newly becomes a coloring material, from the recording medium to which the ink has been applied. When the step of applying a component which forms carbon onto the recording medium is performed after the ink application step, the carbon formation step is performed after these steps. The concentration of carbon thus formed can be controlled by, as well as an application amount of the ink, heating temperature and time in the carbon formation step.

When after application of an ink having a relatively large mineral acid content, the resulting recording medium is left in an environment of normal temperature and normal humidity (temperature: 25° C., relative humidity: 50%), dehydrating action due to the mineral acid occurs along with evaporation of water or the water-soluble organic solvent and thus carbon is formed. With an increase in the content of the mineral acid, however, such a problem as described above occurs, that is, an increase in the viscosity of the ink or easy corrosion of a member of a recording apparatus by the ink makes it difficult to achieve stable ejection. When an ink has a small mineral acid content, on the other hand, the amount of the mineral acid is not sufficient so that the concentration of carbon thus formed decreases or much energy or time is required for the formation of carbon. Thus, it may become difficult to efficiently record an image. It is therefore more preferred to carry out a treatment for increasing the concentration of the mineral acid and thereby form carbon on the recording medium than to increase the mineral acid content in the ink.

Examples of the treatment for increasing the concentration of the mineral acid include heating treatment. Specific examples of the heating treatment include a non-contact type heating treatment such as warm-air heating with a drier or the like and heating with a thermal head (thermal head) or infrared radiation and a contact type heating treatment such as hot press heating with an iron press or heating roller. A proper one or a proper combination may be selected from these heating treatments, depending on the heat resistance or absorption properties of the recording medium. For example, a recording medium (wood, paper, cloth or the like) constituted of cellulose has excellent heat resistance and high absorption properties so that it can be heated efficiently by the hot press heating and carbon can be formed more efficiently by the hot press heating than by the warm-air heating or non-contact heating. A recording medium constituted of a base material such as plastic is inferior in heat resistance and has low absorption properties so that the hot press heating has difficulty in precise temperature adjustment and in addition, contact with ink droplets before the recording medium finishes absorption of the ink may cause disturbance of an image. The non-contact type heating treatment is therefore preferably selected.

Carbon formation may also be performed in the following mode. After the component which forms carbon and the mineral acid are allowed to exist all over the recording medium, the recording medium at a desired position is selectively heated with a thermal head or the like. This makes it possible to form carbon and record an image. In this case, a surplus mineral acid not used for recording of the image is preferably removed. By a washing step performed so as not to remove the carbon thus formed or a carbon removal step which will be described later, both the carbon and the mineral acid can be removed.

The temperature at the time of heating the recording medium in the carbon formation step is preferably 100° C. or more, more preferably 130° C. or more. At a too low temperature, it takes much time to form carbon and productivity decreases. The heating temperature is preferably 300° C. or less, more preferably 250° C. or less. At a too high temperature, the recording medium changes its shape or color due to the heat.

A time between the ink application step and the carbon formation step is preferably within 24 hours, more preferably within one hour. When the time between the ink application step and the carbon formation step is too long, not only the productivity decreases, but also the dehydrating action may proceed excessively to damage the recording medium. Particularly when the recording medium is constituted mainly of cellulose such as wood, paper or cloth, the above-described time range is particularly effective. The ink application step may be followed by the carbon formation step successively and in this case, time between these two steps may be about several seconds.

The Recording Method (2)

The present method is the recording method described in (1) above, wherein the recording medium has been colored in advance and the method further includes, as an applicational step, a carbon removal step of removing carbon from the recording medium. By this carbon removal step, as will be described later, the recording medium is deprived of color at a position where carbon is formed and thus, an image is recorded.

Carbon Removal Step

The present inventors have found that when after the carbon formation step, a carbon removal step such as washing step is performed as an additional step, discoloring of the recording medium, which has been colored in advance, occurs only at the ink-applied portion of the recording medium and thus, an image is recorded. The present inventors have presumed that a decoloring mechanism works because for example in fiber products made of cotton or the like, the surface of cellulose constituting fibers is carbonized and both the carbon thus formed and the coloring material are removed in a washing step with water. In addition, the present inventors have presumed that the above-described mechanism and one of the following three mechanisms work simultaneously.

The first mechanism is that a component of the coloring material that has colored the recording medium therewith and the like dissolves in the mineral acid. The second mechanism is that a component of the coloring material that has colors the recording medium therewith and the like is decomposed by the mineral acid. The third mechanism is that a component of the coloring material that has colored the recording medium therewith and the like becomes soluble in water by the mineral acid and becomes easily removable in a washing step with water.

In a denim fabric, cotton fibers of a warp are dyed with indigo. When the denim fabric is subjected to the ink application step, the carbon formation step and the carbon removal step, a portion of it to which no ink has been applied has an indigo color, while only a portion of it to which the ink has been applied is decolored and becomes close to an original white color of the fibers. Such a phenomenon is presumed to occur because the coloring material indigo is soluble in the mineral acid (particularly, sulfuric acid) or for example when sulfuric acid is used as the mineral acid, indigo is sulfonated into indigo carmine and becomes soluble in water.

Examples of the carbon removal step include a washing step. In this washing step, both the carbon thus formed and a component of the coloring material that has colored the recording medium therewith and the like are preferably removed so that washing with water is preferably performed. In the present step, in order to efficiently remove the carbon thus formed and the component of the coloring material that has colored the recording medium therewith and the like, they may be removed by using a surfactant or by physically rubbing them with a brush or the like. Washing with water is preferably followed by drying of the recording medium.

Ink Jet Recoding Apparatus

Next, the ink jet recording method of the invention will hereinafter be described using one example of an ink jet recording apparatus suited for executing the method.

Figure 1B:
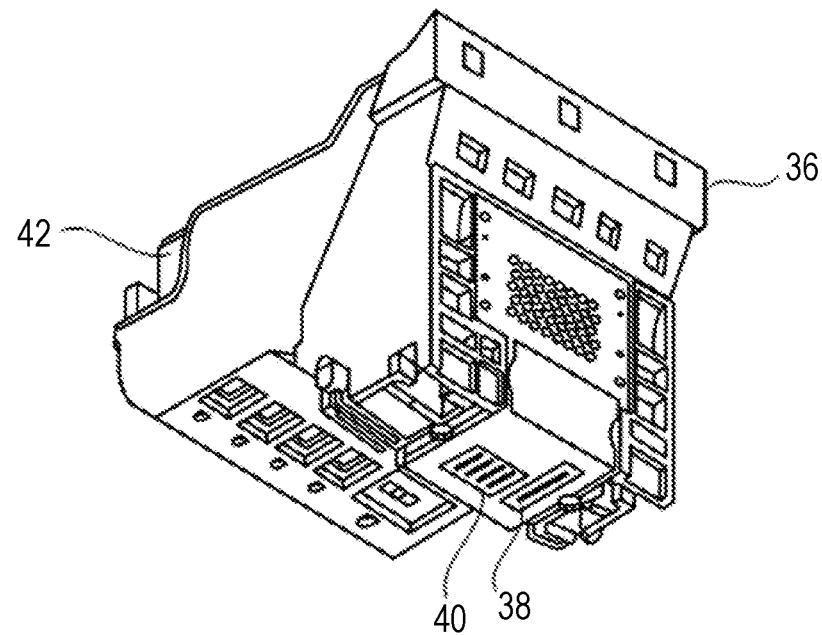

FIGS. 1A and 1B are schematic views showing one example of an ink jet recording apparatus to be used in the ink jet recording method of the invention, in which FIG. 1A is a perspective view of the main part of the ink jet recording apparatus and FIG. 1B is a perspective view of a head cartridge. The ink jet recording apparatus is provided with a conveying unit (not shown) for conveying a recording medium 32 and a carriage shaft 34. The carriage shaft 34 is constituted to have a head cartridge 36 thereon. The head cartridge 36 is equipped with recording heads 38 and 40 and is constituted to have an ink cartridge 42 thereon.

A mineral acid-containing ink is prepared and the ink cartridge 42 is filled with it. The ink cartridge 42 is set in the head cartridge 36. Separately, the recording medium 32 is prepared and is set so that it is conveyed by a conveying unit (not shown). While the head cartridge 36 is conveyed along the carriage shaft 34 in a main scanning direction, an ink (not shown) is ejected toward the recording medium 32 from the recording heads 38 and 40. Then, the recording medium 32 is conveyed by the conveying unit (not shown) in a sub-scanning direction, whereby the mineral acid-containing ink is applied to the recording medium 32 (ink application step).

When the recording medium 32 constituted of a material not containing a component which forms carbon is used, a component which forms carbon by making use of the mineral acid is applied to the recording medium 32 before or after the ink application step. This step may be achieved, similar to the ink application step, by ejection from the recording head or a method, other than ejection, such as coating. The ink-applied recording medium 32 is then subjected to heating treatment or the like to evaporate a liquid component such as water therefrom to relatively increase the concentration of the mineral acid. By making use of the dehydrating action of the resulting mineral acid, carbon is formed (carbon formation step) and an image is recorded on the recording medium. When the recording medium colored in advance is used, a carbon removal step such as washing step is performed further to record (form) an image on the recording medium.

Examples of the ink ejection system include a system of adding dynamic energy to an ink and a system of adding thermal energy to an ink. In the invention, using a system of adding thermal energy to an ink and thereby ejecting the ink is particularly preferred.

EXAMPLES

The invention will hereinafter be described in further detail by Examples and Comparative Examples. The invention is however not limited by the following Examples insofar as it does not depart from the gist of the invention. With respect to the amount of components, "part" or "parts" and "%" are each based on mass unless otherwise particularly indicated.

Preparation of Resin

Resin 1

A commercially available aqueous solution containing a cationic resin (trade name: "Catiomaster PD (PD-7)", product of Yokkaichi Chemical) was used as a liquid containing Resin 1. Resin 1 was a water-soluble resin and the content of Resin 1 in the liquid was 50.0%.

Resin 2

A commercially available aqueous dispersion containing a cationic resin (trade name: "UW-550CS", product of Taisei Fine Chemical) was used as a liquid containing Resin 2. Resin 2 was a resin particle (water dispersible resin) and the content of Resin 2 I the liquid was 34.0%.

Preparation of Ink

Components (unit: %) shown in the upper columns of Table 1 were mixed and the resulting mixture was pressure filtered through a microfilter (product of Fujifilm) having a pore size of 3.0 µm to prepare respective inks. In Table 1, NIKKOL BL-9EX is the trade name of a nonionic surfactant which is a product of Nikko Chemicals. The total content of an acid (mineral acid or organic acid) and water and the content of the acid (mineral acid or organic acid) in each ink are also shown in the lower columns of Table 1. The pH of each ink measured using a portable pH meter (trade name: "D-71", product of Horiba) is shown also in the lower column of Table 1. Without diluting each ink thus prepared, its absorbance at a wavelength within a range of from 300 nm to 800 nm was measured using a spectrophotometer (trade name: "U-3900H", product of Hitachi). The color tone of the ink is also shown in the lower column of Table 1 while designating the color tone of the ink having a sum of the absorbances at wavelengths of 400 nm, 500 nm and 600 nm less than 0.1 as "colorless & transparent".

TABLE 1

| | Composition of ink | | | | | | | |
|---|---|---|---|---|---|---|---|---|
| | Ink | | | | | | | |
| | 1 | 2 | 3 | 4 | 5 | 6 | 7 | 8 |
| Sulfuric acid (96.0%) | 9.4 | 1.5 | 3.1 | 6.3 | 15.6 | | | 9.4 |
| Nitric acid (70.0%) | | | | | | 12.9 | | |
| Phosphoric acid (85.0%) | | | | | | | 17.6 | |
| Acetic acid (99.7%) | | | | | | | | |
| Formic acid (90.0%) | | | | | | | | |
| Liquid containing Resin 1 (50.0%) | 1.0 | | 1.0 | 1.0 | 1.0 | 1.0 | 1.0 | 1.0 |
| Liquid containing Resin 2 (34.0%) | | | | | | | | |
| Glycerin | 4.0 | 2.0 | 5.0 | 5.0 | 5.0 | 5.0 | 1.5 | 7.0 |
| 2-Pyrrolidone | 5.0 | 2.0 | 6.0 | 6.0 | 6.0 | 6.0 | 2.0 | 13.0 |
| 1,2-Hexanediol | 1.0 | 1.0 | 3.0 | 3.0 | 3.0 | 3.0 | 0.5 | 4.0 |
| NIKKOL BL-9EX | 0.5 | 0.5 | 0.5 | 0.5 | 0.5 | 0.5 | 0.5 | 0.5 |
| Ion exchanged water | 79.1 | 93.0 | 81.4 | 78.2 | 68.9 | 71.6 | 76.9 | 65.1 |
| Total content of acid and water (%) | 89.0 | 94.5 | 85.0 | 85.0 | 85.0 | 85.0 | 95.0 | 75.0 |
| Content of acid (%) | 9.0 | 1.4 | 3.0 | 6.0 | 15.0 | 9.0 | 15.0 | 9.0 |
| pH of ink | 1.0 or less | 1.0 | 1.0 or less | 1.0 or less | 1.0 or less | 1.0 or less | 1.0 or less | 1.0 or less |
| Color tone of ink | Colorless & transparent | Colorless & transparent | Colorless & transparent | Colorless & transparent | Colorless & transparent | Colorless & transparent | Colorless & transparent | Colorless & transparent |

TABLE 1-continued

| | Composition of ink | | | | | | |
|---|---|---|---|---|---|---|---|
| | Ink | | | | | | |
| | 9 | 10 | 11 | 12 | 13 | 14 | 15 |
| Sulfuric acid (96.0%) | 9.4 | 9.4 | 9.4 | | | | 0.5 |
| Nitric acid (70.0%) | | | | 12.9 | | | |
| Phosphoric acid (85.0%) | | | | | | | |
| Acetic acid (99.7%) | | | | | 15.0 | | |
| Formic acid (90.0%) | | | | | | 16.7 | |
| Liquid containing Resin 1 (50.0%) | 1.0 | | | | 1.0 | 1.0 | |
| Liquid containing Resin 2 (34.0%) | | 2.0 | | | | | |
| Glycerin | 4.0 | 5.0 | 4.0 | 7.0 | 1.5 | 1.5 | 2.0 |
| 2-Pyrrolidone | 12.0 | 3.0 | 5.5 | 13.5 | 2.0 | 2.0 | 2.0 |
| 1,2-Hexanediol | 3.0 | 2.0 | 1.0 | 4.0 | 0.5 | 0.5 | 1.0 |
| NIKKOL BL-9EX | 0.5 | 0.5 | 0.5 | 0.5 | 0.5 | 0.5 | 0.5 |
| Ion exchanged water | 70.1 | 78.1 | 79.6 | 62.1 | 79.5 | 77.8 | 94.0 |
| Total content of acid and water (%) | 80.0 | 88.8 | 89.0 | 75.0 | 95.0 | 95.0 | 94.5 |
| Content of acid (%) | 9.0 | 9.0 | 9.0 | 9.0 | 15.0 | 15.0 | 0.5 |
| pH of ink | 1.0 or less | 1.0 or less | 1.0 or less | 1.0 or less | more than 1.0 | more than 1.0 | more than 1.0 |
| Color tone of ink | Colorless & transparent | Colorless & transparent | Colorless & transparent | Colorless & transparent | Colorless & transparent | Colorless & transparent | Colorless & transparent |

Preparation of Recording Medium

Following recording media (A4 size) were prepared. The constitution and the like of those recording media are shown in Table 2.

Recording Medium 1

A recording medium obtained by affixing a cypress thin sheet to both sides of paper (trade name: "Kinokami (two-sided wooden type)" for laser printer, Japanese cypress, product of Creco Labo) was used as Recording medium 1.

Recording Medium 2

A recording medium obtained by affixing a red pine thin sheet to both sides of paper (trade name: "Kinokami (two-sided wooden type)" light type for ink jet printer, red pine, product of Creco Labo) was used as Recording medium 2.

Recording Medium 3

Japanese paper (trade name: "Echizenkizukibousho", product of HAIBARA) was used as Recording medium 3.

Recording Medium 4

A plain cotton cloth (purchased from Yuzawaya) was used as Recording medium 4.

Recording Medium 5

Japanese paper (trade name: "Echizenkizukibousho", product of HAIBARA) dyed with indigo was used as Recording Medium 5.

Recording Medium 6

To 1150 parts of ion exchanged water was added 100 parts of polyvinyl alcohol (trade name: "PVA235", product of Kuraray, saponification degree: 88%, average polymerization degree: 3500) under stirring to dissolve the latter in the former at 90° C. to prepare an 8% aqueous polyvinyl alcohol solution. To 736.85 parts of ion exchanged water was added 263.15 parts of lactose monohydrate under stirring to dissolve the latter in the former at 40° C. to prepare a 25% aqueous lactose solution. To the resulting aqueous lactose solution was added the aqueous polyvinyl alcohol solution so that the polyvinyl alcohol (solid content) became 10 parts based on 100 parts of the lactose (solid content) to obtain a mixed solution. To the mixed solution thus obtained was added a 3.5% aqueous orthoboric acid solution so that the orthoboric acid (solid content) became 4.5 parts based on 100 parts of the polyvinyl alcohol (solid content), followed by sufficient mixing to obtain Coating liquid 1.

Coating liquid 1 thus obtained was coated to a 0.3-mm thick copper sheet (obtained from Misumi) with a bar coater and then, dried for 24 hours with a hot plate of 100° C. In such a manner, a copper sheet coated with lactose was prepared as Recording medium 6. The film thickness of lactose when dried was 25 μm.

Recording Medium 7

The liquid (1.0 part) containing Resin 1, 5.0 parts of an aqueous dispersion of cellulose nanofiber, 4.0 parts of glycerin, 11.4 parts of 2-pyrrolidone, 4.0 parts of 1,2-hexanediol, 0.5 part of a nonionic surfactant and 74.1 parts of ion exchanged water were mixed to prepare Treatment liquid 1. As the aqueous dispersion of cellulose nanofiber, a commercially available aqueous dispersion (trade name: "BiNFi-s", product of Sugino Machine) having a solid content of 2.0% was used. As the nonionic surfactant, "Acetylenol E100" (trade name; product of Kawaken Fine Chemicals) was used.

An ink cartridge was filled with Treatment liquid 1 thus obtained and set in an ink jet recording apparatus (trade name: "PIXUS Pro10", product of Canon). From all the ejection orifices of the recording head, it was ejected continuously for 10 seconds at a drive frequency of 1,000 Hz and normal ejection of Treatment liquid 1 from each of the ejection orifices was confirmed. Here, an image recorded under the condition in which two ink droplets, each 4.5 ng, are applied to a 1/600 inch×1/600 inch unit region is defined to have a recording duty of 100%. To a 200 mm wide×290 mm long region of a 0.3 mm-thick copper sheet (obtained from Misumi) was added Treatment liquid 1 in an amount corresponding to 100% of the recording duty. The liquid was dried for one hour on a hot plate of 100° C. The above-described cycle was repeated to prepare a copper sheet coated with cellulose as Recording Medium 7. The film thickness of cellulose when dried was 10 μm.

Recording Medium 8

A denim cloth having a thickness of 10 ounces (obtained from Yuzawaya) was used as Recording medium 8. In the denim cloth, only the warp is dyed with indigo.

Recording Medium 9

A recording medium having a cypress thin sheet affixed to both sides of paper (trade name: "Kinokami (two-sided wooden type)" for laser printer, cypress, product of Creco Labo) was dyed with indigo and used as Recording medium 9.

Recording Medium 10

To 1150 parts of ion exchanged water was added 100 parts of polyvinyl alcohol (trade name: "PVA235", product of Kuraray, saponification degree: 88%, average polymerization degree: 3500) under stirring to dissolve the latter in the former at 90° C. to prepare an 8% aqueous polyvinyl alcohol solution. To an aqueous dispersion of chitin nanofiber (trade name: "BiNFi-s", product of Sugino Machine, solid content: 2.0%) was added the aqueous polyvinyl alcohol solution so that the polyvinyl alcohol (solid content) became 10 parts based on 100 parts of the aqueous dispersion to obtain a mixed liquid. To the mixed liquid thus obtained was added a 5.0% aqueous orthoboric acid solution so that the orthoboric acid (solid content) became 3.5 parts based on 100 parts of the polyvinyl alcohol (solid content), followed by sufficient mixing to obtain Coating liquid 2.

An adhesive-free 130-μm thick transparent polyethylene terephthalate film (obtained from EUROPORT) was subjected to surface modification by corona discharge. Then, Coating liquid 2 obtained above was coated to it with a bar coater, followed by drying for 24 hours on a hot plate of 100° C. A cycle of coating and drying of the coating liquid was repeated to prepare a polyethylene terephthalate film coated with chitin as Recording medium 10. The film thickness of chitin when dried was 25 μm.

Recording Medium 11

A 0.3-mm thick copper sheet (obtained from Misumi) was used as Recording medium 11.

Recording Medium 12

An adhesive-free 130-μm thick transparent polyethylene terephthalate film (obtained from EUROPORT) was used as Recording medium 12.

TABLE 2

| | Constitution of recording medium | | |
|---|---|---|---|
| Recording medium | Constitution | Material (of base material) | Component which forms carbon |
| 1 | Cypress thin sheet | Wood | Cellulose |
| 2 | Red pine thin sheet | Wood | Cellulose |
| 3 | Japanese paper | Paper | Cellulose |
| 4 | Cotton cloth | Cloth | Cellulose |
| 5 | Japanese paper dyed with indigo | Paper | Cellulose |
| 6 | Copper sheet coated with lactose | Metal | Lactose |
| 7 | Copper sheet coated with cellulose | Metal | Cellulose |
| 8 | Denim cloth | Cloth | Cellulose |
| 9 | Cypress thin sheet dyed with indigo | Wood | Cellulose |
| 10 | Copper sheet coated with chitin | Metal | None |
| 11 | Copper sheet | Metal | None |
| 12 | Polyethylene terephthalate film | Resin | None |

Recording of Image

An ink cartridge was filled with each of the inks thus obtained and set in an ink jet recording apparatus (trade name: "PIXUS Pro10", product of Canon). In the present Example, an ink application amount under the condition of applying two ink droplets, each 4.5 ng, to a 1/600 inch×1/600 inch unit region, is defined as an amount for recording duty of 100%. By ejecting the ink continuously for one minute at a drive frequency of 10,000 Hz, normal ejection of it was confirmed. Then, to a 200 mm wide×200 mm long region of each of the above-described recording media, the ink was applied in an amount corresponding to 100% of the recording duty.

Next, an image was recorded by each of the carbon formation steps (and carbon removal steps). The term "hot press" in Table 3 means that the carbon formation step was performed using a hot press heating system. More specifically, the recording medium was heated by applying an automatic iron for home use (trade name: "NI-A66", product of Panasonic") to the recording medium at a temperature shown in Table 3. The term "warm air" in Table 3 means that the carbon formation step was performed using a warm air heating system. More specifically, by exposing the recording medium to warm air shown in Table 3 from the vertical direction by using a dryer (trade name: "Solis 315 dryer, product of Solis), the recording medium was heated. The longest heating time in each carbon formation step was set at 30 seconds. When the carbon formation step was followed by the carbon removal step, the recording medium was scrubbed and washed with water and a brush and then dried sufficiently at room temperature.

During those image recording procedures, the following evaluation was performed. In the present evaluation, A and B are acceptable levels and C is an unacceptable level, each based on the below-described evaluation criteria. Evaluation results are shown in Table 3.

Evaluation

Clarity of Image

After each carbon formation step, a formation state of carbon making use of the mineral acid was visually observed and carbon formation was evaluated. When the carbon formation step was followed by the carbon removal step, by visually observing a decoloring state at the position to which a mineral acid was applied, clarity of the image was evaluated based on the following evaluation criteria.
A: Carbon was formed and the image thus recorded has sufficient visibility.
B: Although carbon was formed, the image seemed slightly pale.
C: No carbon was formed and no visible image was recorded, or although carbon was formed, the image was pale and almost lacked visibility.

Time Until Carbon Formation

Time necessary for each carbon formation step, that is, time from the starting time of the carbon formation step until formation of carbon and recording of a visible image was measured three times and the time until carbon formation was evaluated from an average of them based on the following criteria.
A: Time until carbon formation was 10 seconds or less.
B: Time until carbon formation was more than 10 seconds to 20 seconds or less.
C: Time until carbon formation was more than 20 seconds or no image was recorded.

Abrasion Resistance

When the carbon formation step was not followed by the carbon removal step, the abrasion resistance of the image by the carbon thus formed was evaluated, while when the carbon formation step was followed by the carbon removal step, the abrasion resistance of the image decolored after the carbon removal step was evaluated. A friction test of the image thus recorded was performed using an abrasion resistance tester (product of Imoto Machinery Co., Ltd.), a Gakushin-type tester in accordance with JIS L 0849, under the conditions of a load of 250 g and 10 reciprocations. The image after the friction test was visually observed and evaluated based on the following criteria.
A: The image had no abrasion mark or the image had a slight abrasion mark.
B: The image had an abrasion mark and the background of the recording medium slightly appeared therefrom.
C: The background of the recording medium appeared from the abrasion or since no image was recorded, the recording medium exhibited its background.

TABLE 3

Evaluation condition and evaluation results

| | | | | Evaluation conditions | | | | Evaluation results | | | |
| | | | | Carbon formation step | | | | | | Time until carbon formation | Abrasion |
| | | Ink | Recording medium | Heating means | Heating temperature (° C.) | Carbon removal step | | Clarity of image | Rank | Second | resistance of image |
|---|---|---|---|---|---|---|---|---|---|---|---|
| Example | 1 | 1 | 1 | Hot press | 140 | Not included | | A | A | 7 | A |
| | 2 | 2 | 1 | Hot press | 200 | Not included | | A | B | 20 | B |
| | 3 | 1 | 2 | Hot press | 140 | Not included | | A | A | 5 | A |
| | 4 | 1 | 3 | Hot press | 140 | Not included | | A | A | 5 | A |
| | 5 | 1 | 4 | Hot press | 140 | Not included | | A | A | 5 | A |
| | 6 | 1 | 5 | Hot press | 140 | Not included | | A | A | 5 | A |
| | 7 | 3 | 1 | Hot press | 140 | Not included | | A | A | 6 | A |
| | 8 | 4 | 1 | Hot press | 140 | Not included | | A | A | 5 | A |
| | 9 | 5 | 1 | Hot press | 140 | Not included | | A | A | 4 | A |
| | 10 | 1 | 6 | Warm air | 140 | Not included | | A | B | 16 | A |
| | 11 | 1 | 7 | Warm air | 140 | Not included | | B | B | 17 | A |
| | 12 | 6 | 1 | Hot press | 140 | Not included | | B | B | 11 | A |
| | 13 | 7 | 1 | Hot press | 140 | Not included | | A | A | 8 | A |
| | 14 | 8 | 1 | Hot press | 140 | Not included | | A | B | 11 | A |
| | 15 | 9 | 1 | Hot press | 140 | Not included | | A | A | 9 | A |
| | 16 | 1 | 1 | Hot press | 120 | Not included | | A | B | 14 | A |
| | 17 | 1 | 1 | Hot press | 130 | Not included | | A | A | 10 | A |
| | 18 | 1 | 1 | Hot press | 200 | Not included | | A | A | 2 | A |
| | 19 | 10 | 1 | Hot press | 140 | Not included | | A | A | 5 | A |
| | 20 | 11 | 1 | Hot press | 140 | Not included | | A | A | 7 | B |
| | 21 | 12 | 6 | Warm air | 120 | Not included | | B | B | 20 | B |
| | 22 | 1 | 8 | Hot press | 140 | Included | | A | A | 5 | A |
| | 23 | 1 | 9 | Hot press | 140 | Included | | A | A | 5 | A |
| | 24 | 6 | 8 | Hot press | 140 | Included | | B | B | 11 | A |
| | 25 | 7 | 8 | Hot press | 140 | Included | | A | A | 6 | A |
| | 26 | 8 | 8 | Hot press | 140 | Included | | A | B | 12 | A |
| | 27 | 9 | 8 | Hot press | 140 | Included | | A | A | 10 | A |
| | 28 | 1 | 8 | Hot press | 120 | Included | | A | B | 14 | A |
| | 29 | 1 | 8 | Hot press | 130 | Included | | A | A | 10 | A |
| | 30 | 1 | 8 | Hot press | 200 | Included | | A | A | 2 | A |
| | 31 | 11 | 8 | Hot press | 140 | Included | | A | A | 5 | B |
| | 32 | 10 | 8 | Hot press | 140 | Included | | A | A | 5 | A |
| | 33 | 12 | 8 | Hot press | 120 | Included | | A | B | 15 | A |

TABLE 3

Evaluation condition and evaluation results (Continued)

| | | | Evaluation conditions | | | | Evaluation results | | | |
| --- | --- | --- | --- | --- | --- | --- | --- | --- | --- | --- |
| | | | | Carbon formation step | | | | Time until carbon formation | | Abrasion resistance of image |
| | | Ink | Recording medium | Heating means | Heating temperature (° C.) | Carbon removal step | Clarity of image | Rank | Second | |
| Comp. Ex. | 1 | 13 | 1 | Hot press | 140 | Not included | C | C | — | C |
| | 2 | 14 | 1 | Hot press | 140 | Not included | C | C | — | C |
| | 3 | 15 | 1 | Hot press | 200 | Not included | C | C | — | C |
| | 4 | 1 | 1 | None | — | Not included | C | C | — | C |
| | 5 | 13 | 1 | None | — | Not included | C | C | — | C |
| | 6 | 1 | 10 | Warm air | 140 | Not included | C | C | — | C |
| | 7 | 1 | 11 | Warm air | 140 | Not included | C | C | — | C |
| | 8 | 1 | 12 | Warm air | 140 | Not included | C | C | — | C |
| | 9 | 13 | 8 | Hot press | 140 | Included | C | C | — | C |
| | 10 | 14 | 8 | Hot press | 140 | Included | C | C | — | C |
| | 11 | 1 | 8 | None | — | Included | C | C | — | C |
| | 12 | 13 | 8 | None | — | Included | C | C | — | C |
| | 13 | 1 | 10 | Warm air | 140 | Included | C | C | — | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2018-140506, filed Jul. 26, 2018, and 2019-106144, filed Jun. 6, 2019, which are hereby incorporated by reference herein in their entirety.

What is claimed is:

1. An ink jet recording method of recording an image on a recording medium, the method comprising:
   an ink application step of applying to the recording medium a colorless transparent aqueous ink containing a mineral acid and having a pH of 1.0 or less; and
   a carbon formation step of forming a carbon atom by depriving a water molecule from a carbon atom-containing component in the recording medium by the mineral acid,
   wherein (i) the recording medium has a component which forms carbon by making use of the mineral acid or (ii) when the recording medium does not have a component which forms carbon by making use of the mineral acid, the method further comprises a step of applying the component which forms carbon by making use of the mineral acid, and
   wherein the component which forms carbon by making use of the mineral acid comprises a saccharide.

2. The ink jet recording method according to claim 1, wherein the recording medium is colored in advance and the method further comprises, after the carbon formation step, a carbon removal step of removing the resultant carbon from the recording medium.

3. The ink jet recording method according to claim 1, wherein the recording medium is selected from the group consisting of wood, paper and cloth.

4. The ink jet recording method according to claim 1, wherein the mineral acid comprises sulfuric acid or phosphoric acid.

5. The ink jet recording method according to claim 1, wherein the mineral acid comprises sulfuric acid.

6. The ink jet recording method according to claim 1, wherein a total content (% by mass) of the mineral acid and water in the ink is 80.0% by mass or more based on a total mass of the ink.

7. The ink jet recording method according to claim 1, wherein the carbon formation step is carried out by heating the recording medium and wherein a temperature of the heating is 130° C. or more.

8. The ink jet recording method according to claim 1, wherein the aqueous ink contains a resin.

9. An ink jet recording method of recording an image on a recording medium, the method comprising:
   an ink application step of applying to the recording medium a colorless transparent aqueous ink containing a mineral acid and having a pH of 1.0 or less; and
   a carbon formation step of forming a carbon atom by depriving a water molecule from a carbon atom-containing component in the recording medium by the mineral acid,
   wherein the recording medium is colored in advance and the method further comprises, after the carbon formation step, a carbon removal step of removing the resultant carbon from the recording medium.

* * * * *